US008099766B1

(12) United States Patent
Corbett

(10) Patent No.: US 8,099,766 B1
(45) Date of Patent: Jan. 17, 2012

(54) CREDENTIAL CACHING FOR CLUSTERED STORAGE SYSTEMS

(75) Inventor: Peter F. Corbett, Lexington, MA (US)

(73) Assignee: NetApp, Inc., Sunnyvale, CA (US)

( * ) Notice: Subject to any disclaimer, the term of this patent is extended or adjusted under 35 U.S.C. 154(b) by 1098 days.

(21) Appl. No.: 11/691,179

(22) Filed: Mar. 26, 2007

(51) Int. Cl.
*G06F 17/30* (2006.01)
(52) U.S. Cl. .......................................................... 726/6
(58) Field of Classification Search .................... 726/6
See application file for complete search history.

(56) References Cited

U.S. PATENT DOCUMENTS

| | | | | |
|---|---|---|---|---|
| 5,560,008 | A * | 9/1996 | Johnson et al. | 726/5 |
| 5,875,296 | A * | 2/1999 | Shi et al. | 726/5 |
| 6,052,785 | A * | 4/2000 | Lin et al. | 726/5 |
| 6,671,773 | B2 | 12/2003 | Kazar | |
| 6,775,783 | B1 * | 8/2004 | Trostle | 726/6 |
| 7,519,813 | B1 * | 4/2009 | Cox et al. | 713/165 |
| 2003/0191810 | A1 * | 10/2003 | Muhlestein et al. | 709/215 |
| 2004/0064729 | A1 * | 4/2004 | Yellepeddy | 713/201 |
| 2005/0192932 | A1 * | 9/2005 | Kazar et al. | 707/1 |
| 2005/0289644 | A1 * | 12/2005 | Wray | 726/5 |
| 2008/0077635 | A1 * | 3/2008 | Sporny et al. | 707/204 |

OTHER PUBLICATIONS

Tanenbaum, Andrew S., "The Internet Transport Protocols (TCP and UDP)", Computer Networks, Third Edition, Section 6.4, Mar. 1996, pp. 521-542, Prentice Hall, New Jersey.

Sun Microsystems, Inc., "NFS: Network File System Protocol Specification", Network Working Group Request for Comments 1094, IETF, Mar. 1989, pp. 1-26.
U.S. Appl. No. 11/118,466, entitled System and Method for Multiplexing Channels Over Multiple Connections in a Storage System Cluster, filed by Peter F. Corbett, et al., on Apr. 29, 2005, 39 pages.
U.S. Appl. No. 11/119,279, entitled System and Method for Implementing Atomic Cross-Stripe Write, Operations in a Striped Volume Set, filed by Richard P. Jernigan, IV, et al., on Apr. 29, 2005, 60 pages.
U.S. Appl. No. 10/910,164, entitled System and Method for a Sidecar Authentication Mechanism, filed by Benjamin T.H. Cox, et al., on Aug. 2, 2004, 38 pages.
U.S. Appl. No. 10/858,182, entitled System and Method for Associating NIS Attributes With CIFS Clients, filed by John Eric Hoffmann, et al., on Jun. 1, 2004, 36 pages.

* cited by examiner

*Primary Examiner* — David García Cervetti
*Assistant Examiner* — Michael S McNally
(74) *Attorney, Agent, or Firm* — Cesari and McKenna, LLP

(57) ABSTRACT

A technique efficiently transmits credentials between network elements and disk elements in a clustered storage system. According to the novel technique, in response to a user request to access data served by a data element, a network element inserts (adds) a credential associated with the user to a network element credential cache and creates a corresponding credential handle that indexes the credential in that cache. The network element relays the credential and credential handle to the disk element, which adds the credential to a corresponding disk element credential cache at a location indexed by the corresponding credential handle. Requests may then be sent between the elements using the credential handle. In addition, the network element may further send a series of chained requests to the disk element for the same credential/credential handle with an indication that the requests are for the same credential without sending the credential or credential handle.

30 Claims, 9 Drawing Sheets

CREDENTIAL CACHE 600 (a/b)

| CREDENTIAL HANDLE 605 | CREDENTIAL 610 |
|---|---|
| 1 | CRED 1 |
| 2 | CRED 2 |
| 3 | CRED 3 |
| ⋮ | ⋮ |
| N | CRED N |
| ⋮ | ⋮ |
| CURRENT | CURRENT CREDENTIAL |

ENTRIES 620

CREDENTIAL CACHING FOR CLUSTERED STORAGE SYSTEMS

FIELD OF THE INVENTION

The present invention is directed to storage system and, in particular, to credentials in a clustered storage system.

BACKGROUND OF THE INVENTION

A storage system typically comprises one or more storage devices into which information may be entered, and from which information may be obtained, as desired. The storage system includes a storage operating system that functionally organizes the system by, inter alia, invoking storage operations in support of a storage service implemented by the system. The storage system may be implemented in accordance with a variety of storage architectures including, but not limited to, a network-attached storage environment, a storage area network, and a disk assembly directly attached to a client or host computer. The storage devices are typically disk drives organized as a disk array, wherein the term "disk" commonly describes a self-contained rotating magnetic media storage device. The term disk in this context is synonymous with hard disk drive (HDD) or direct access storage device (DASD).

The storage operating system of the storage system may implement a high-level module, such as a file system, to logically organize the information stored on volumes as a hierarchical structure of data containers, such as files and logical units. For example, each "on-disk" file may be implemented as set of data structures, i.e., disk blocks, configured to store information, such as the actual data for the file. These data blocks are organized within a volume block number (vbn) space that is maintained by the file system. The file system may also assign each data block in the file a corresponding "file offset" or file block number (fbn). The file system typically assigns sequences of fbns on a per-file basis, whereas vbns are assigned over a larger volume address space. The file system organizes the data blocks within the vbn space as a "logical volume"; each logical volume may be, although is not necessarily, associated with its own file system.

A known type of file system is a write-anywhere file system that does not overwrite data on disks. If a data block is retrieved (read) from disk into a memory of the storage system and "dirtied" (i.e., updated or modified) with new data, the data block is thereafter stored (written) to a new location on disk to optimize write performance. A write-anywhere file system may initially assume an optimal layout such that the data is substantially contiguously arranged on disks. The optimal disk layout results in efficient access operations, particularly for sequential read operations, directed to the disks. An example of a write-anywhere file system that is configured to operate on a storage system is the Write Anywhere File Layout (WAFL™) file system available from Network Appliance, Inc., Sunnyvale, Calif.

The storage system may be further configured to operate according to a client/server model of information delivery to thereby allow many clients to access data containers, such as files and logical units, stored on the system. In this model, the client may comprise an application, such as a database application, executing on a computer that "connects" to the storage system over a computer network, such as a point-to-point link, shared local area network (LAN), wide area network (WAN), or virtual private network (VPN) implemented over a public network such as the Internet. Each client may request the services of the storage system by issuing file-based and block-based protocol messages (in the form of packets) to the system over the network.

A plurality of storage systems may be interconnected to provide a storage system cluster configured to service many clients. Each storage system or node may be configured to service one or more volumes, wherein each volume stores one or more data containers. Communication among the nodes involves the exchange of information between two or more entities interconnected by communication links. These entities are typically software programs executing on the nodes. The nodes communicate by exchanging discrete packets or messages of information according to predefined protocols. In this context, a protocol consists of a set of rules defining how the nodes interact with each other.

Each node generally provides its services through the execution of software modules, such as processes. A process is a software program that is defined by a memory address space. For example, an operating system of the node may be implemented as a single process with a large memory address space, wherein pieces of code within the process provide operating system services, such as process management. Yet, the node's services may also be implemented as separately-scheduled processes in distinct, protected address spaces. These separate processes, each with its own process address space, execute on the node to manage resources internal to the node and, in the case of a database or network protocol, to interact with a variety of network elements.

Services that are part of the same process address space communicate by accessing the same memory space. That is, information exchanged between services implemented in the same process address space is not transferred, but rather may be accessed in a common memory. However, communication among services that are implemented as separate processes is typically effected by the exchange of messages. For example, information exchanged between different address spaces of processes is transferred as one or messages between different memory spaces of the processes. A known message-passing mechanism provided by an operating system to transfer information between process address spaces is the Inter Process Communication (IPC) mechanism.

Resources internal to the node may include communication resources that enable a process on one node to communicate over the communication links or network with another process on a different node. The communication resources include the allocation of memory and data structures, such as messages, as well as a network protocol stack. The network protocol stack, in turn, comprises layers of software, such as a session layer, a transport layer and a network layer. The Internet protocol (IP) is a network layer protocol that provides network addressing between nodes, whereas the transport layer provides a port service that identifies each process executing on the nodes and creates a connection between those processes that indicate a willingness to communicate. Examples of trans-port layer protocols include the Transmission Control Protocol (TCP) and other reliable connection protocols.

Broadly stated, the connection provided by the transport layer, such as that provided by TCP, is a reliable, securable logical circuit between pairs of processes. A TCP process executing on each node establishes the TCP connection in accordance with a conventional "3-way handshake" arrangement involving the exchange of TCP message or segment data structures. The resulting TCP connection is identified by port numbers and IP addresses of the nodes. The TCP transport service provides reliable delivery of a message using a TCP transport header. The TCP protocol and establishment of a TCP connection are described in Computer Networks, 3rd Edition, particularly at pgs. 521-542, which is hereby incorporated by reference as though fully set forth herein.

The session layer manages the establishment or binding of an association between two communicating processes in the nodes. In this context, the association is a session comprising a series of interactions between the two communicating processes for a period of time, e.g., during the span of a connection. Upon establishment of the one or more connections, the processes take turn exchanging information, such as commands and is data, over the session, typically through the use of request and response messages in accordance with a network protocol.

The storage system may be configured to operate with a plurality of file-level protocols, such as the Common Internet File System (CIFS) and the Network File System (NFS) protocols to thereby enhance the utility of the system for networking clients. As such, the storage system is typically configured with a CIFS server and/or an NFS server. The NFS protocol is typically utilized by Unix-based clients to access data sets served by the NFS server, whereas the CIFS protocol is typically associated with Microsoft Windows-based clients serviced by the CIFS server. NFS and CIFS utilize one or more authentication techniques for identifying access limitations to a particular data set, such as a file.

Specifically, the NFS protocol utilizes a conventional network information services (NIS) set of attributes. As such, the terms NFS attributes and NIS attributes shall be used interchangeably herein, however it is understood that NIS encompasses more than just NFS. NFS utilizes a user identifier (UID) and a primary group identifier (GID) for authentication. To that end, the UID and GIDs are sent from the client to the NFS server in a conventional NFS credential with every NFS operation containing a data access request. The NFS server compares the received UID and/or GID with permissions associated with a particular file. The NFS server does not perform any additional authentication, but simply accepts the UID/GID that is asserted by the client when sending the data access request. In an exemplary NFS environment, the permissions associated with a file are stored as mode bits, which are divided into three fields, namely the permissions associated with the owner, with the group, and with others. Each of the three fields contains three bits, one for read access, one for write access, and one for execute permission. NFS mode bits for permissions are further described in *Request for Comments* 1094: *Network File System Protocol Specification*, by Bill Nowicki, March 1989, the contents of which are hereby incorporated by reference.

Additionally, one technique for improving the authentication of NFS requests is the use of NFS-Kerberos. In a conventional NFS-Kerberos implementation, the client is transmits a conventional Kerberos ticket to the NFS server of the storage system to assert its name, and the storage system constructs an appropriate file system credential from the asserted Kerberos ticket. (Notably, all clients communicating with the NFS server in this manner must support NFS-Kerberos as a Kerberos ticket is inserted into each NFS request sent to the server.)

The CIFS protocol does not trust the client to transmit the correct credentials with a data access request. In a CIFS environment, user identifiers are not UIDs as utilized by NFS but comprise security identifiers (SIDs), which are unique on a worldwide basis. One or more identification authorities authenticate a given SID, as described further below. When a CIFS command arrives at the CIFS server, the credential is compared with an access control list (ACL). An ACL consists of zero or more access control entries (ACE). Each ACE consists of a SID, which identifies the person or group to which the ACE applies, and a set of permissions, which can identify access allowance or denial. Thus, an ACE may identify a particular SID and denote that access is not to be granted to the person(s) identified by that SID.

Credentials, generally, are well understood by those skilled in the art. Broadly stated, a credential is information that identifies an authenticated user or machine ("requesters"). For instance, an authenticating device may receive a request from a user (e.g., a client device) to access particular data in storage. The authenticating device authenticates the requester's identity and associates a corresponding credential with the requester. Notably, the credential may be stored locally to the authenticating device or in one or more external credential databases (e.g., Lightweight Director Access Protocol or "LDAP" servers, etc.). Once the requester is authenticated, the request may be passed to a data access device (e.g., responsible for communicating with the data in storage) along with the corresponding credential, which is the authenticated requester identity used to process the request. (A passed credential typically contains the identity of a single authenticated user for a single domain and domain type, as will be understood by those skilled in the art.)

As noted, there are different styles of credentials based on the particular operating environment(s) used. For instance, CIFS and NFS protocols (e.g., Windows and Unix, respectively) may each utilize a particular style of credential unique to their respective environments. Generally, credentials are variable in length, depending upon the relevant information stored therein. Sometimes, credentials may be large and complicated (e.g., especially very large CIFS credentials) and as such, a large amount of bandwidth may be required to (inefficiently) transmit the credentials between the authenticating device and the data access device. In addition, it may be particularly burdensome on processing resources (e.g., CPU, memory, etc.) at both devices to marshal, transfer, and unmarshal the sometimes large and complicated credentials. That is, to exchange the credentials between the devices, the credentials may need to be generated/collected and manipulated to comply with a transmission exchange protocol (e.g., packets) at a first device, and then received and re-manipulated (e.g., back to an original credential form) by a second device, as will be appreciated by those skilled in the art.

SUMMARY OF THE INVENTION

The present invention overcomes the disadvantages of the prior art by providing a technique for efficiently transmitting credentials among nodes of a clustered storage system. In particular, one or more embodiments of the present invention provide a system and method that store comparatively larger (e.g., full) credentials at caches of particular nodes of the storage system, and create credential "handles" that index the larger credentials. The nodes of the storage system may then transmit the smaller credential handles as opposed to the larger credentials, thus reducing traffic sent between nodes and processing performed at the nodes.

Illustratively, each node is generally organized as a network element and/or a disk element, wherein the network element generally interfaces with a network and may be used to authenticate and direct user requests to one or more disk elements, each of which generally interfaces with storage and communicates with (e.g., access) data in storage (e.g., on one or more disks). Each element includes a cluster fabric interface module adapted to implement a network protocol, which integrates a session infrastructure and an application operation set into a session layer. The session layer manages the creation and termination of sessions between a pair of elements in the cluster. Each session provides a context for the flow of request messages and the flow of corresponding response messages to those requests through the network.

In response to a user request to access data served by a data element, the network element inserts (adds) a credential associated with the user (e.g., an authenticated requester credential) to a network element credential cache and creates a corresponding credential handle that indexes the credential in that cache. The network element then relays the credential and credential handle to the disk element, which adds the credential to a corresponding disk element credential cache at a location indexed by the corresponding credential handle. Requests may then be sent between the network element and the disk element using the credential handle. In addition and in accordance with one or more embodiments described herein, the network element may further send a series of chained requests to the disk element for the same credential/credential handle with an indication that the requests are for the same credential without sending the credential or credential handle to the disk element.

Advantageously, the novel technique efficiently transmits credentials between network elements and disk elements in a clustered storage system. By establishing credential caches on the network elements and disk elements, traffic sent within the clustered storage system between the elements (particularly, credential information) may be substantially reduced. Also, processing of the credential information may be reduced in the network elements and disk elements, e.g., particularly where large credentials are used.

BRIEF DESCRIPTION OF THE DRAWINGS

The above and further advantages of invention may be better understood by referring to the following description in conjunction with the accompanying drawings in which like reference numerals indicate identical or functionally similar elements:

FIG. 6 is a schematic block diagram of an example credential cache that may be used in accordance with the present invention;

DETAILED DESCRIPTION OF AN ILLUSTRATIVE EMBODIMENT

One or more embodiments of the present invention provide a technique for efficiently transmitting credentials among nodes of a clustered storage system. In particular, a system and method is provided that store comparatively larger (e.g., full) credentials at is caches of particular nodes of the storage system, and create credential "handles" that index the larger credentials. The nodes of the storage system may then transmit the smaller credential handles as opposed to the larger credentials, thus reducing traffic sent between nodes and processing performed at the nodes.

A. Cluster Environment

Figure 1:
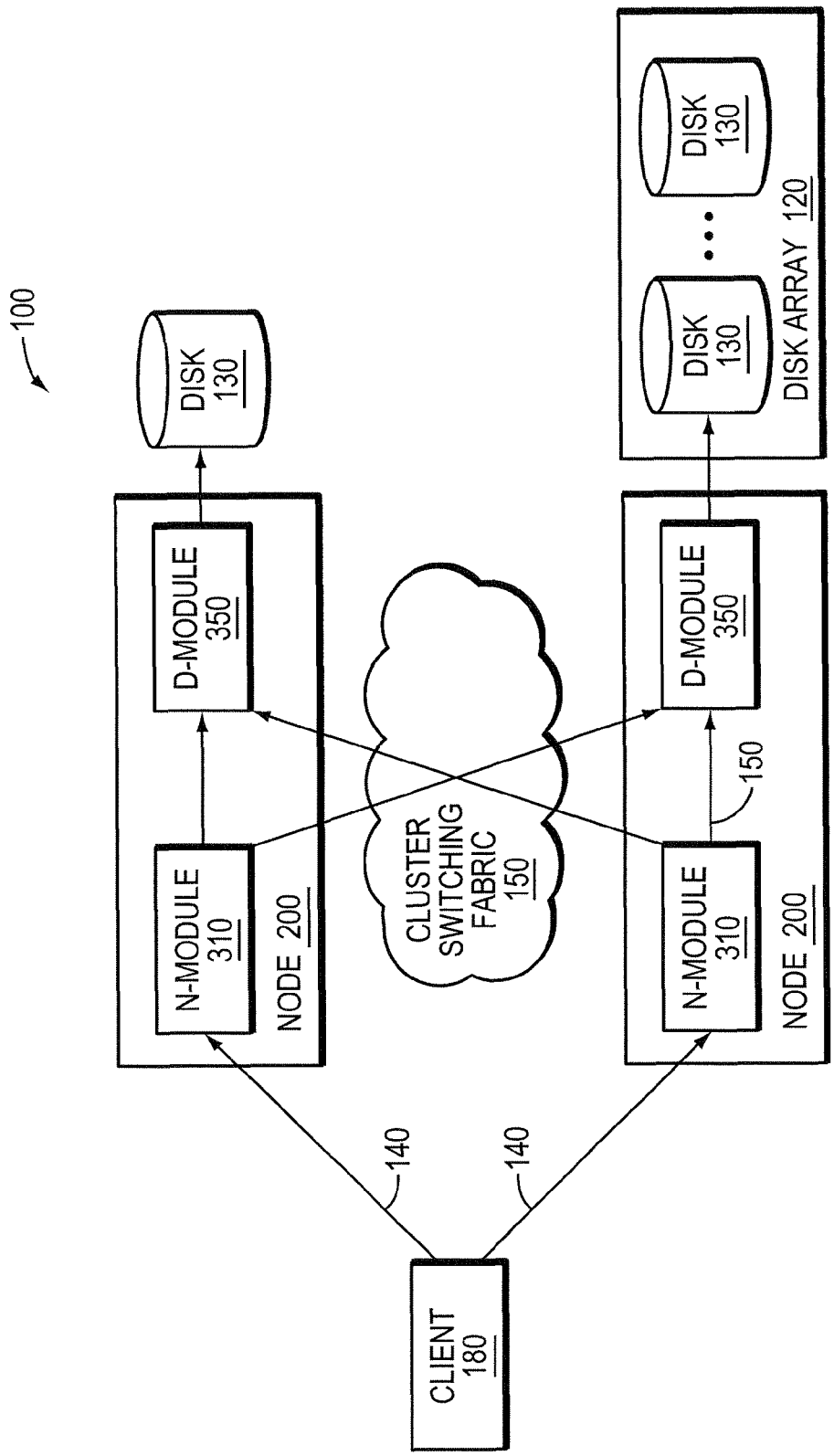
FIG. 1 is a schematic block diagram of a plurality of nodes interconnected as a cluster in accordance with an embodiment of the present invention.

FIG. 1 is a schematic block diagram of a plurality of nodes 200 interconnected as a cluster 100 and configured to provide storage service relating to the organization of information on storage devices. The nodes 200 comprise various functional components that cooperate to provide a distributed storage system architecture of the cluster 100. To that end, each node 200 is generally organized as a network element (N-module 310) and a disk element (D-module 350). The N-module 310 includes functionality that enables the node 200 to connect to clients 180 over a computer network 140, while each D-module 350 connects to one or more storage devices, such as disks 130 of a disk array 120. The nodes 200 are interconnected by a cluster switching fabric 150 which, in the illustrative embodiment, may be embodied as a Gigabit Ethernet switch. An exemplary distributed file system architecture is generally described in U.S. Pat. No. 6,671,773 titled METHOD AND SYSTEM FOR RESPONDING TO FILE SYSTEM REQUESTS, by M. Kazar et al. issued on Dec. 30, 2003. It should be noted that while there is shown an equal number of N and D-modules in the illustrative cluster 100, there may be differing numbers of N and/or D-modules in accordance with various embodiments of the present invention. For example, there may be a plurality of N-modules and/or D-modules interconnected in a cluster configuration 100 that does not reflect a one-to-one correspondence between the N and D-modules. As such, the description of a node 200 comprising one N-module and one D-module should be taken as illustrative only.

The clients 180 may be general-purpose computers configured to interact with the node 200 in accordance with a client/server model of information delivery. That is, each client may request the services of the node, and the node may return the results of the services requested by the client, by exchanging packets over the network 140. The client may issue packets including file-based access protocols, such as the Common Internet File System (CIFS) protocol or Network File System (NFS) protocol, over the Transmission Control Protocol/Internet Protocol (TCP/IP) when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

B. Storage System Node

Figure 2:
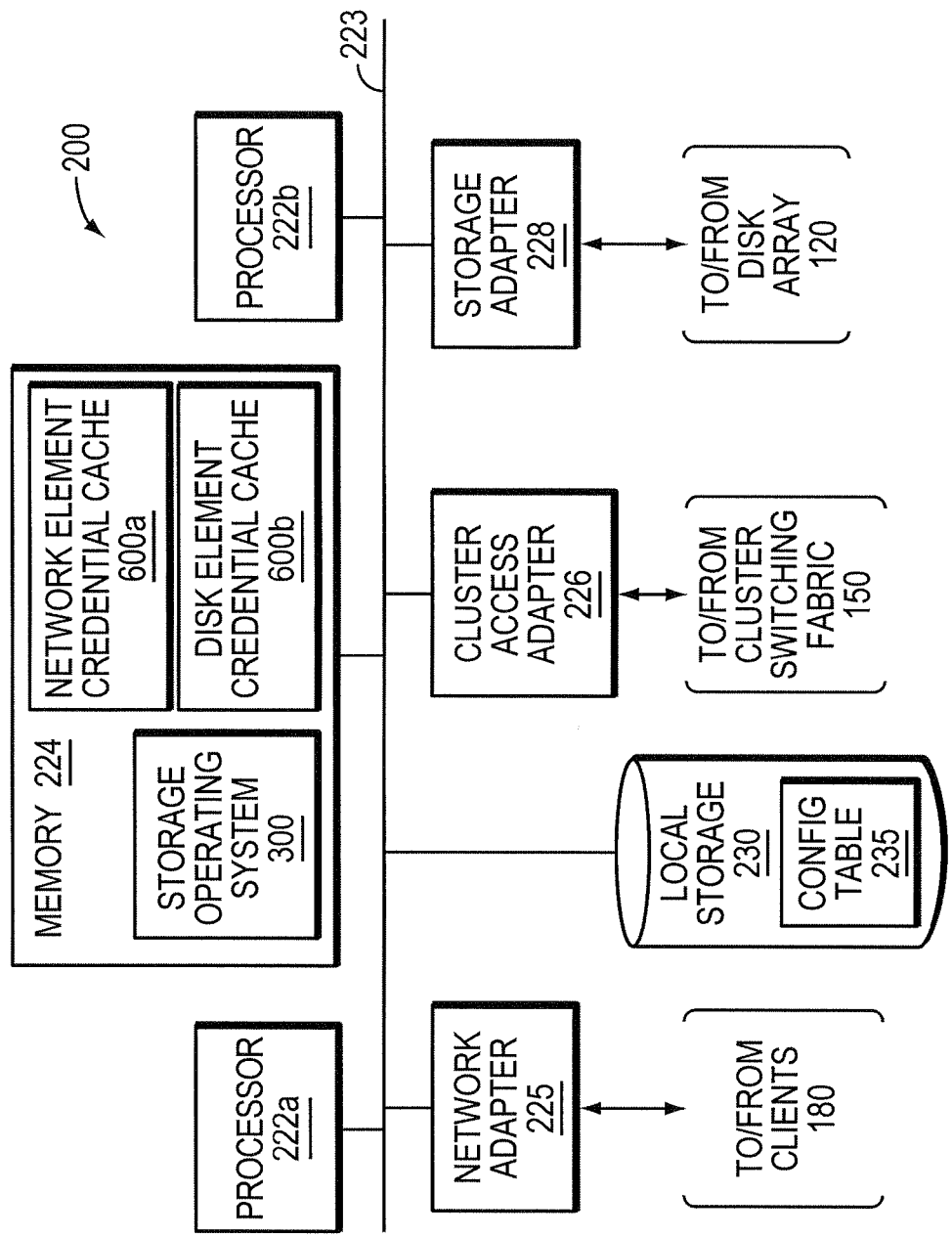
FIG. 2 is a schematic block diagram of a node in accordance with an embodiment of the present invention.

FIG. 2 is a schematic block diagram of a node 200 that is illustratively embodied as a storage system comprising a plurality of processors 222a,b, a memory 224, a network adapter 225, a cluster access adapter 226, a storage adapter 228 and local storage 230 interconnected by a system bus 223. The local storage 230 comprises one or more storage devices, such as disks, utilized by the node to locally store configuration information (e.g., in configuration table 235) provided by one or more management processes. The cluster access adapter 226 comprises a plurality of ports adapted to couple the node 200 to other nodes of the cluster 100. In the illustrative embodiment, Ethernet is used as the clustering protocol and interconnect media, although it will be apparent to those skilled in the art that other types of protocols and interconnects may be utilized within the cluster architecture described herein. In alternate embodiments where the N-modules and D-modules are implemented on separate storage systems or computers, the cluster access adapter 226 is utilized by the N/D-module for communicating with other N/D-modules in the cluster 100.

Each node 200 is illustratively embodied as a dual processor storage system executing a storage operating system 300 that preferably implements a high-level module, such as a file system, to logically organize the information as a hierarchical structure of named directories, files and special types of files called virtual disks (hereinafter generally "blocks") on the disks. However, it will be apparent to those of ordinary skill in the art that the node 200 may alternatively comprise a single or more than two processor system. Illustratively, one processor 222a executes the functions of the N-module 310 on the node, while the other processor 222b executes the functions of the D-module 350.

The memory 224 illustratively comprises storage locations that are addressable by the processors and adapters for storing software program code and data structures associated with the present invention (e.g., network element credential cache 600a and disk element credential cache 600b, described herein). The processor and adapters may, in turn, comprise processing elements and/or logic circuitry configured to execute the software code and manipulate the data structures. The storage operating system 300, portions of which is typically resident in memory and executed by the processing elements, functionally organizes the node 200 by, inter alia, invoking storage operations in support of the storage service implemented by the node. It will be apparent to those skilled in the art that other processing and memory means, including various computer readable media, may be used for storing and executing program instructions pertaining to the invention described herein.

The network adapter 225 comprises a plurality of ports adapted to couple the node 200 to one or more users/clients 180 over point-to-point links, wide area networks, virtual private networks implemented over a public network (Internet) or a shared local area network. The network adapter 225 thus may comprise the mechanical, electrical and signaling circuitry needed to connect the node to the network. Illustratively, the computer network 140 may be embodied as an Ethernet network or a Fibre Channel (FC) network. Each client 180 may communicate with the node over network 140 by exchanging discrete frames or packets of data according to pre-defined protocols, such as TCP/IP.

The storage adapter 228 cooperates with the storage operating system 300 executing on the node 200 to access information requested by the clients. The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on the disks 130 of array 120. The storage adapter comprises a plurality of ports having input/output (I/O) interface circuitry that couples to the disks over an I/O interconnect arrangement, such as a conventional high-performance, FC link topology.

Storage of information on each array 120 is preferably implemented as one or more storage "volumes" that comprise a collection of physical storage disks 130 cooperating to define an overall logical arrangement of volume block number (vbn) space on the volume(s). Each logical volume is generally, although not necessarily, associated with its own file system. The disks within a logical volume/file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used in accordance with the inventive principles described herein.

C. Storage Operating System

To facilitate access to the disks 130, the storage operating system 300 implements a write-anywhere file system that cooperates with one or more virtualization modules to "virtualize" the storage space provided by disks 130. The file system logically organizes the information as a hierarchical structure of named data containers, such as directories and files on the disks. Each "on-disk" file may be implemented as set of disk blocks configured to store information, such as data, whereas the directory may be implemented as a specially formatted file in which names and links to other files and directories are stored. The virtualization module(s) allow the file system to further logically organize information as a hierarchical structure of data containers, such as blocks on the disks that are exported as named logical unit numbers (luns).

In the illustrative embodiment, the storage operating system is preferably the NetApp® Data ONTAP™ operating system available from Network Appliance, Inc., Sunnyvale, Calif. that implements a Write Anywhere File Layout (WAFL™) file system. However, it is expressly contemplated that any appropriate storage operating system may be enhanced for use in accordance with the inventive principles described herein. As such, where the term "WAFL" is employed, it should be taken broadly to refer to any storage operating system that is otherwise adaptable to the teachings of this invention.

Figure 3:
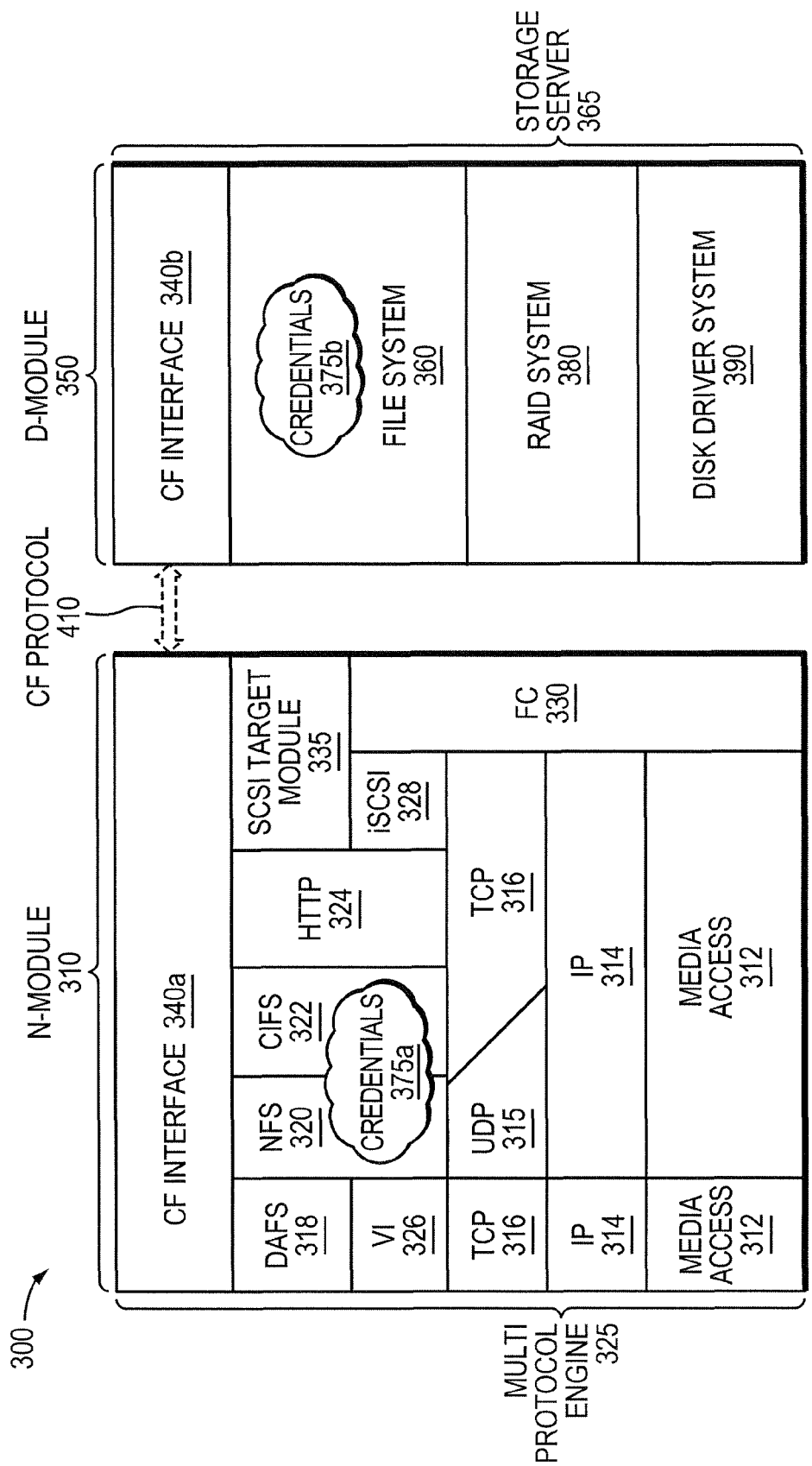
FIG. 3 is a schematic block diagram of a storage operating system that may be advantageously used with the present invention.

FIG. 3 is a schematic block diagram of the storage operating system 300 that may be advantageously used with the present invention. The storage operating system comprises a series of software layers organized to form an integrated network protocol stack or, more generally, a multi-protocol engine 325 that provides data paths for clients to access information stored on the node using block and file access protocols. The multi-protocol engine includes a media access layer 312 of network drivers (e.g., gigabit Ethernet drivers) that interfaces to network protocol layers, such as the IP layer 314 and its supporting transport mechanisms, the TCP layer 316 and the User Datagram Protocol (UDP) layer 315. A file system protocol layer provides multi-protocol file access and, to that end, includes support for the Direct Access File System (DAFS) protocol 318, the NFS protocol 320, the CIFS protocol 322 and the Hypertext Transfer Protocol (HTTP) protocol 324. Also, as described herein, a credential management and caching function 375a is illustratively in cooperating relation with NFS protocol 320 and/or CIFS protocol 322. A VI layer 326 implements the VI architecture to provide direct access transport (DAT) capabilities, such as RDMA, as required by the DAFS protocol 318. An iSCSI driver layer 328 provides block protocol access over the TCP/IP network protocol layers, while an FC driver layer 330 receives and transmits block access requests and responses to and from the node. The FC and iSCSI drivers provide FC-specific and iSCSI-specific access control to the blocks and, thus, manage exports of luns to either iSCSI or FCP or, alternatively, to both iSCSI and FCP when accessing the blocks on the node 200.

In addition, the storage operating system includes a series of software layers organized to form a storage server 365 that provides data paths for accessing information stored on the disks 130 of the node 200. To that end, the storage server 365 includes a file system module 360 in cooperating relation with a credential management and caching function 375b (described below), a RAID system module 380 and a disk driver system module 390. The RAID system 380 manages the storage and retrieval of information to and from the volumes/disks in accordance with I/O operations, while the disk driver system 390 implements a disk access protocol such as, e.g., the SCSI protocol.

The file system 360 implements a virtualization system of the storage operating system 300 through the interaction with one or more virtualization modules illustratively embodied as, e.g., a virtual disk (vdisk) module (not shown) and a SCSI target module 335. The vdisk module enables access by administrative interfaces, such as a user interface of a management framework, in response to a user (system administrator) issuing commands to the node 200. The SCSI target module 335 is generally disposed between the FC and iSCSI drivers 328, 330 and the file system 360 to provide a translation layer of the virtualization system between the block (lun) space and the file system space, where luns are represented as files.

The file system 360 is illustratively a message-based system that provides logical volume management capabilities for use in access to the information stored on the storage devices, such as disks. That is, in addition to providing file system semantics, the file system 360 provides functions normally associated with a volume manager. These functions include (i) aggregation of the disks, (ii) aggregation of storage bandwidth of the disks, and (iii) reliability guarantees, such as mirroring and/or parity (RAID). The file system 360 illustratively implements the WAFL file system (hereinafter generally the "write-anywhere file system") having an on-disk format representation that is block-based using, e.g., 4 kilobyte (kB) blocks and using index nodes ("inodes") to identify files and file attributes (such as creation time, access permissions, size and block location). The file system uses files to store meta-data describing the layout of its file system; these meta-data files include, among others, an inode file. A file handle, i.e., an identifier that includes an inode number, is used to retrieve an inode from disk.

Broadly stated, all inodes of the write-anywhere file system are organized into the is inode file. A file system (fs) info block specifies the layout of information in the file system and includes an inode of a file that includes all other inodes of the file system. Each logical volume (file system) has an fsinfo block that is preferably stored at a fixed location within, e.g., a RAID group. The inode of the inode file may directly reference (point to) data blocks of the inode file or may reference indirect blocks of the inode file that, in turn, reference data blocks of the inode file. Within each data block of the inode file are embedded inodes, each of which may reference indirect blocks that, in turn, reference data blocks of a file.

Operationally, a request from the client 180 is forwarded as a packet over the computer network 140 and onto the node 200 where it is received at the network adapter 225. A network driver (of layer 312 or layer 330) processes the packet and, if appropriate, passes it on to a network protocol and file access layer for additional processing prior to forwarding to the write-anywhere file system 360. This additional processing may illustratively include, inter alia, user authentication and associated credential management (e.g., by credential management and caching function, "credentials" 375a), such as described herein in accordance with the present invention. Upon receiving the request (packet), the file system 360 performs credential management (e.g., credential management and caching function, "credentials" 375b) in accordance with the present invention described herein, and also generates operations to load (retrieve) the requested data from disk 130 if it is not resident "in core", i.e., in memory 224. If the information is not in memory, the file system 360 indexes into the inode file using the inode number to access an appropriate entry and retrieve a logical vbn. The file system then passes a message structure including the logical vbn to the RAID system 380; the logical vbn is mapped to a disk identifier and disk block number (disk,dbn) and sent to an appropriate driver (e.g., SCSI) of the disk driver system 390. The disk driver accesses the dbn from the specified disk 130 and loads the requested data block(s) in memory for processing by the node. Upon completion of the request, the node (and operating system) returns a reply to the client 180 over the network 140. (Note that further description of the storage operating system 300, particularly an illustrative message exchange protocol between the multi-protocol engine 325 and the storage server 365, is detailed below under the heading "D. CF PROTOCOL".)

It should be noted that the software "path" through the storage operating system layers described above needed to perform data storage access for the client request received at the node may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by node 200 in response to a request issued by client 180. Moreover, in another alternate embodiment of the invention, the processing elements of adapters 225, 228 may be configured to offload some or all of the packet processing and storage access operations, respectively, from processor 222, to thereby increase the performance of the storage service provided by the node. It is expressly contemplated that the various processes, architectures and procedures described herein can be implemented in hardware, firmware or software.

As used herein, the term "storage operating system" generally refers to the computer-executable code operable on a computer to perform a storage function that manages data access and may, in the case of a node 200, implement data access semantics of a general purpose operating system. The storage operating system can also be implemented as a microkernel, an application program operating over a general-purpose operating system, such as UNIX® or Windows NT®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network, and a disk assembly directly-attached to a client or host computer. The term "storage system" should therefore be taken broadly to include such arrangements in addition to any subsystems configured to perform a storage function and associated with other equipment or systems. It should be noted that while this description is written in terms of a write any where file system, the teachings of the present invention may be utilized with any suitable file system, including a write in place file system.

D. CF Protocol

In the illustrative embodiment, the storage server 365 is embodied as D-module 350 of the storage operating system 300 to service one or more volumes of array 120. In addition, the multi-protocol engine 325 is embodied as N-module 310 to (i) perform protocol termination with respect to a client issuing incoming data access request packets over the network 140, as well as (ii) redirect those data access requests to any storage server 365 of the cluster 100. Moreover, the N-module 310 and D-module 350 cooperate to provide a highly-scalable, distributed storage system architecture of the cluster 100. To that end, each module includes a cluster fabric (CF) interface module 340a,b adapted to implement intra-cluster communication among the modules, including D-module-to-D-module communication for, e.g., data container striping operations.

The protocol layers, e.g., the NFS/CIFS layers and the iSCSI/FC layers, of the N-module 310 function as protocol servers that translate file-based and block based data access requests from clients into CF protocol messages used for communication with the D-module 350. That is, the N-module servers convert the incoming data access requests into file system primitive operations (commands) that are embedded within CF messages by the CF interface module 340 for transmission to the D-modules 350 of the cluster 100. In particular, in accordance with the present invention described herein, the N-modules manage credentials of the requests and credentials within the CF messages sent to the D-modules. For instance, as mentioned above and as will be understood by those skilled in the art, a credential is information that identifies an authenticated user or machine. Accordingly, the CF protocol messages may be used to communicate these credentials (and/or credential handles, described herein) between the N-modules and D-modules, i.e., to identify an authenticated user or machine. Notably, the CF interface modules 340 cooperate to provide a single file system image across all D-modules 350 in the cluster 100. Thus, any network port of an N-module that receives a client request can access any data container within the single file system image located on any D-module 350 of the cluster.

Further to the illustrative embodiment, the N-module 310 and D-module 350 are implemented as separately-scheduled processes of storage operating system 300; however, in an alternate embodiment, the modules may be implemented as pieces of code within a single operating system process. Communication between an N-module and D-module is thus illustratively effected through the use of message passing between the modules although, in the case of remote communication between an N-module and D-module of different nodes, such message passing occurs over the cluster switching fabric 150. A known message-passing mechanism provided by the storage operating system to transfer information between modules (processes) is the Inter Process Communication (IPC) mechanism.

The protocol used with the IPC mechanism is illustratively a generic file and/or block-based "agnostic" CF protocol that comprises a collection of methods/functions constituting a CF application programming interface (API). Examples of such an agnostic protocol are the SpinFS and SpinNP protocols available from Network Appliance, Inc. The SpinFS protocol is described in the above-referenced U.S. Pat. No. 6,671,773. To that end, the CF protocol is illustratively a multi-layered network protocol that integrates a session infrastructure and an application operation set into a session layer. The session layer manages the establishment and termination of sessions between modules in the cluster and is illustratively built upon a connection layer that defines a set of functionality or services provided by a connection-oriented protocol. The connection-oriented protocol may include a framing protocol layer over a network transport, such as TCP or other reliable connection protocols, or a memory-based IPC protocol. An example of a session layer that may be advantageously used with the present invention is described in commonly owned, copending U.S. patent application Ser. No. 11/118,466 entitled SYSTEM AND METHOD FOR MULTIPLEXING CHANNELS OVER MULTIPLE CONNECTIONS IN A STORAGE SYSTEM CLUSTER, filed by Peter F. Corbett et al. on Apr. 29, 2005, now issued as U.S. Pat. No. 7,443,872 on Oct. 28, 2008, the contents of which are hereby incorporated in their entirety as though fully set forth herein.

The CF interface module 340 implements the CF protocol for communicating file system commands among the modules of cluster 100. Communication is illustratively effected by the D-module exposing the CF API to which an N-module (or another D-module) issues calls. To that end, the CF interface module 340 is organized as a CF encoder and CF decoder. The CF encoder of, e.g., CF interface 340a on N-module 310 encapsulates a CF message as (i) a local procedure call (LPC) when communicating a file system command to a D-module 350 residing on the same node 200 or (ii) a remote procedure call (RPC) when communicating the command to a D-module residing on a remote node of the cluster 100. In either case, the CF decoder of CF interface 340b on D-module 350 de-encapsulates the CF message and processes the file system command.

Figure 4:
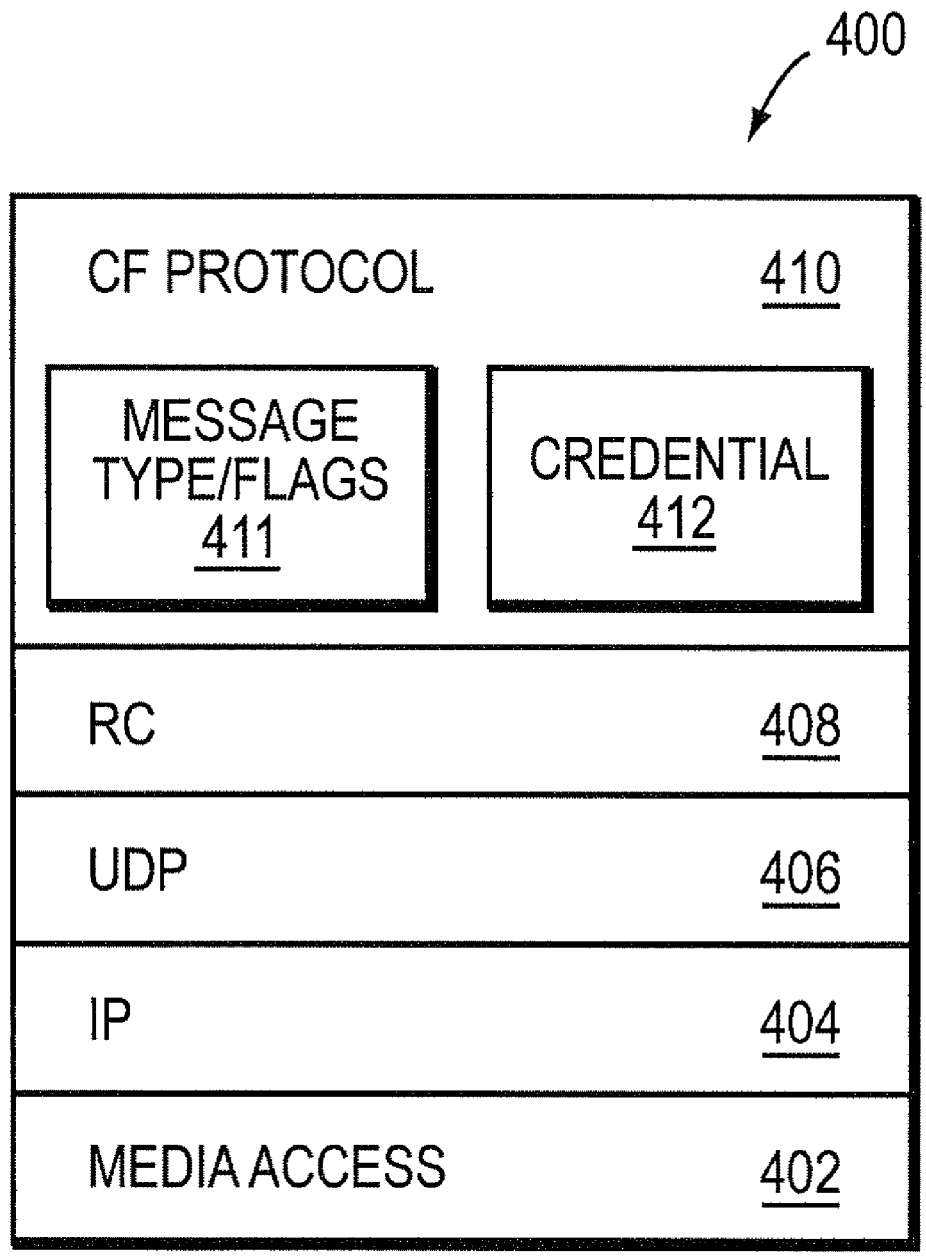
FIG. 4 is a schematic block diagram illustrating the format of a cluster fabric (CF) message in accordance with an embodiment of the present invention.

FIG. 4 is a schematic block diagram illustrating the format of a CF message 400 in accordance with an embodiment of with the present invention. The CF message 400 is illustratively used for RPC communication over the switching fabric 150 between remote modules of the cluster 100; however, it should be understood that the term "CF message" may be used generally to refer to LPC and RPC communication between modules of the cluster. The CF message 400 includes a media access layer 402, an IP layer 404, a UDP layer 406, a reliable connection (RC) layer 408 and a CF protocol layer 410. As noted, the CF protocol is a generic file system protocol that conveys file system commands related to operations contained within client requests to access data containers stored on the cluster 100; the CF protocol layer 410 is that portion of message 400 that carries the file system commands. To that end, in accordance with the present invention, CF protocol layer 410 may comprise a message type/flags field 411 and one or more credential fields 412 that may be used to transmit credentials and/or credential handles as described herein. Illustratively, the CF protocol is datagram based and, as such, involves transmission of messages or "envelopes" in a reliable manner from a source (e.g., an N-module 310) to a destination (e.g., a D-module 350). The RC layer 408 implements a reliable transport protocol that is adapted to process such envelopes in accordance with a connectionless protocol, such as UDP 406.

E. File System Organization and Storage System Architecture

Figure 5:
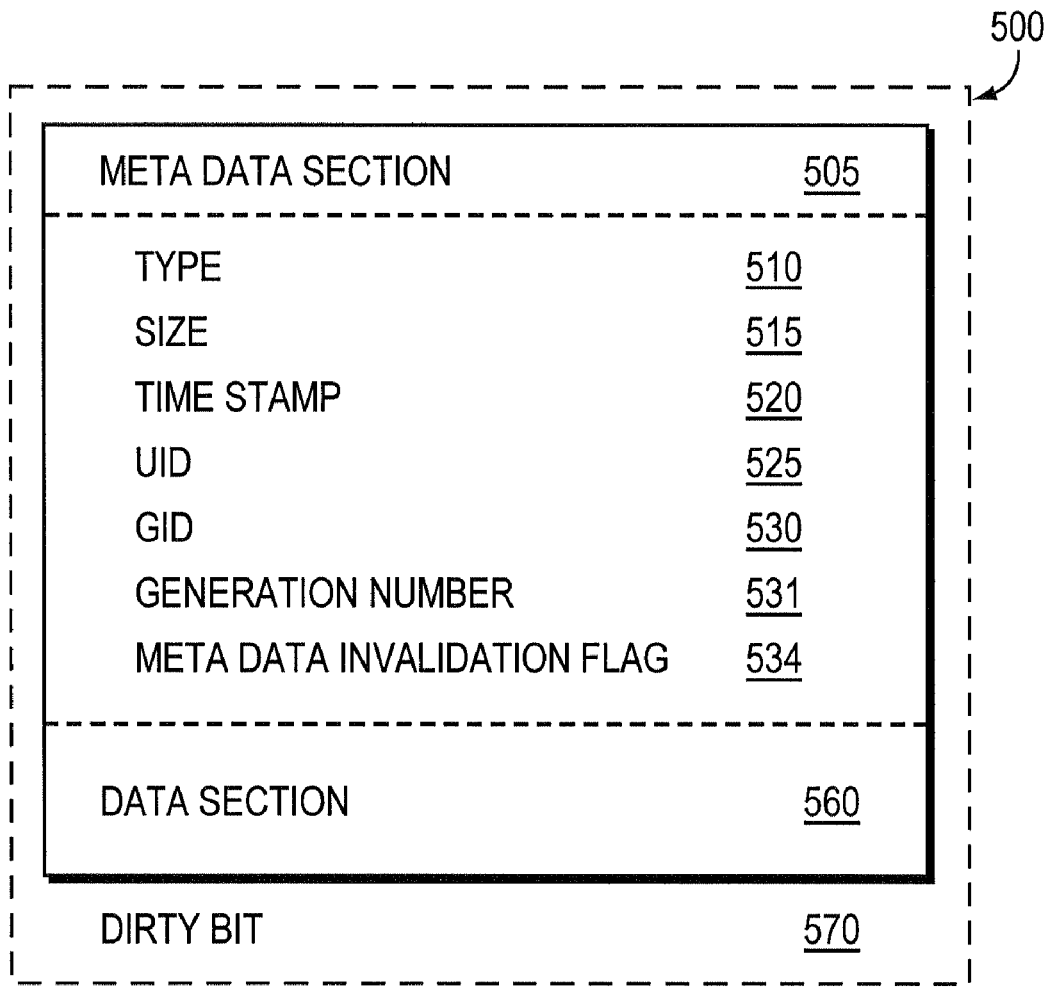
FIG. 5 is a schematic block diagram of an exemplary inode in accordance with an embodiment of the present invention.

In the illustrative embodiment, a data container is represented in the write-anywhere file system as an inode data structure adapted for storage on the disks 130. FIG. 5 is a schematic block diagram of an inode 500, which preferably includes a meta-data section 505 and a data section 560. The information stored in the meta-data section 505 of each inode 500 describes the data container (e.g., a file) and, as such, includes the type (e.g., regular, directory, vdisk) 510 of file, its size 515, time stamps (e.g., access and/or modification time) 520, and ownership, i.e., user identifier (UID 525) and group ID (GID 530), of the file. The meta-data section 505 also includes a generation number 531, and a meta-data invalidation flag field 534. The contents of the data section 560 of each inode may be interpreted differently depending upon the type of file (inode) defined within the type field 510. For example, the data section 560 of a directory inode contains meta-data controlled by the file system, whereas the data section of a regular inode contains file system data. In this latter case, the data section 560 includes a representation of the data associated with the file.

In accordance with an embodiment of the present invention, a storage system architecture illustratively comprises two or more volumes distributed across a plurality of nodes 200 of cluster 100. The volumes are organized as a striped volume set (SVS) and configured to store content of data containers, such as files and luns, served by the cluster in response to multi-protocol data access requests issued by clients 180. Notably, the content of each data container is apportioned among the volumes of the SVS to thereby improve the efficiency of storage service provided by the cluster. To facilitate a description and understanding of the present invention, data containers are hereinafter referred to generally as "files".

To determine the location of a D-module 350 to which to transmit a CF message 400, the N-module 310 may utilize a database process (e.g., a VFS location database or "VLDB" process, not shown) that tracks the locations of various storage components (e.g., a VFS, or Virtual File System) within the cluster 100 to thereby facilitate routing of requests throughout the cluster. In the illustrative embodiment, the N-module 310 of each node has a look up table, e.g., config table 235, that maps the VFS ID of a file handle to a D-module 350 that "owns" (is running) the VFS within the cluster. The VLDB provides the contents of the look up table by, among other things, keeping track of the locations of the VFSs within the cluster. The VLDB has a remote procedure call (RPC) interface, e.g., a Sun RPC interface, which allows the N-module 310 to query the VLDB. When encountering a VFS ID that is not stored in its mapping table, the N-module sends an RPC to the VLDB process. In response, the VLDB returns to the N-module the appropriate mapping information, including an identifier of the D-module that owns the VFS. The N-module stores the information in its look up table and uses the D-module ID to forward the incoming request to the appropriate VFS. Determining the location of a D-module 350 to which an N-module transmits a CF message is further described in commonly owned, copending U.S. patent application Ser. No. 11/119,279, entitled SYSTEM AND METHOD FOR IMPLEMENTING ATOMIC CROSS-STRIPE WRITE OPERATIONS IN A STRIPED VOLUME SET, filed by Richard P. Jernigan, IV et al. on Apr. 29, 2005, now issued as U.S. Pat. No. 7,743,210 on Jun. 22, 2010.

F. Credential Caching

As mentioned above, credentials are generally well understood by those skilled in the art as information that identifies an authenticated user or machine ("requesters"). That is, an authenticating device (e.g., network element/N-module 310) may receive a request from a user (e.g., a client device) to access particular data in storage and, in response, authenticates the requester's identity and associates a corresponding credential with the requester. The network element is responsible for using the correct credential for each request, e.g., depending upon the client protocol (e.g., CIFS, NFS, etc.), user domain, virtual interface used, and any other conditions that can determine user credentials, as will be understood by those skilled in the art. (Notably, each module, node, and cluster/storage system may have its own credential, known generally as "machine credentials," such as for interoperation with other modules, nodes, clusters through fabric 150.)

Details on how a node 200 may generate credentials for received requests is described generally in commonly owned, copending U.S. patent application Ser. No. 10/910,164, entitled SYSTEM AND METHOD FOR A SIDECAR AUTHENTICATION MECHANISM, filed by Benjamin T. H. Cox et al. on Aug. 2, 2004, now issued as U.S. Pat. No. 7,519,813 on Apr. 14, 2009, and commonly owned, copending U.S. patent application Ser. No. 10/858,182, entitled SYSTEM AND METHOD FOR ASSOCIATING NIS ATTRIBUTES WITH CIFS CLIENTS, filed by John Eric Hoffmann et al. on Jun. 1, 2004, now issued as U.S. Pat. No. 7,668,881 on Feb. 23, 2010, the contents of both of which are hereby incorporated in their entirety as though fully set forth herein.

Illustratively, the network element passes the request to a data access device (e.g., disk element/D-module 350) along with the corresponding credential, which is the authenticated requester identity used by the disk elements to process the request. Generally, disk elements use the received credentials from the network elements without questioning them (i.e., the D-modules "trust" the N-modules to authenticate and send proper credentials). As noted, sending full credentials between network elements and disk elements may require a large amount of bandwidth within the cluster fabric 150, while marshaling, transferring, and unmarshaling the full credentials may be particularly burdensome on processing resources (e.g., CPU, memory, etc.) at both elements.

The present invention overcomes the disadvantages of the prior art by providing a technique for efficiently transmitting credentials among nodes of a clustered storage system, e.g., between network elements (N-modules 310) and disk elements (D-modules 350). According to the invention, in response to a user request to access data served by a data element, a network element inserts (adds) a credential associated with the user (e.g., an authenticated requester credential) to a network element credential cache and creates a corresponding credential handle that indexes the credential in that cache. The network element then relays (transmits) the credential and credential handle to the disk element, which adds the credential to a corresponding disk element credential cache at a location indexed by the corresponding credential handle. Requests may then be sent/transmitted between the network element, and the disk element using the credential handle. Effectively, the credential handle represents a mapping between a full credential (which may be large and complicated) to an illustratively smaller identifier (the credential handle). Credential handles, therefore, reduce the need to transfer complete (full) credentials over is the cluster fabric network 150, such as transmitting full NFS and/or CIFS credentials over the CF protocol (messages 400) with each request as mentioned above, and possibly reduce the processing of such credentials as well.

FIG. 6 is a schematic block diagram of an example credential cache 600 (e.g., network and/or disk element credential cache 600*a/b*) that may be used in accordance with the present invention. Credential cache 600 is illustratively stored in memory 224 and includes one or more entries 620, each comprising a plurality of fields for storing a credential handle 605 and a corresponding credential 610. The credential cache 600*a* is illustratively maintained and managed by the network element (N-module 310), while the credential cache 600*b* is illustratively maintained and managed by the disk element (D-module 350). Accordingly, network and disk elements populate the credential cache 600 with credentials 610 and credential handles 605 in accordance with the present invention as described herein. Notably, while the credential caches 600*a* and 600*b* are shown (in FIG. 2) sharing the same memory 224 of node 200, each element (N-module or D-module) may have their own dedicated memory (not shown) for organizing the respective credential cache. Moreover, while separate credential caches 600*a* and 600*b* are shown for the network and disk element of a node 200, a combined cache 600 (within each individual node 200) may also be used accordingly (e.g., where the N-module and D-module of a node 200 share space in memory for a cache 600).

Operationally, the network element (N-module 310) may establish a requester credential in a conventional manner in response to a received request (e.g., from a user/client 180) or in response to other events, such as pre-configuration by a system administrator, etc., as will be understood by those skilled in the art. Notably, the established credential is associated with the requester/client and a session between the network element and, e.g., a disk element configured to service the request. The network element then generates/determines a credential handle that uniquely identifies the associated credential and is unambiguous for the lifetime of the session in which it is established. The credential handle 605 is used to represent a requester's credential, illustratively by uniquely indexing ("pointing to") a particular entry 620 of the cache 600 that contains the actual credential 610. As shown in cache 600, credential handles 605 are represented "1, 2, 3, . . . N" etc., but those skilled in the art will understand that any value (e.g., a 64-bit value, substantially smaller than conventional credentials) may be used to index to a particular entry 620 for a corresponding credential 610 (e.g., represented as "CRED 1, CRED 2," etc.). For example, the network element may establish a requester credential "CRED 2," and may thus create/generate an associated credential handle "2," both of which are stored in the network element credential cache 600*a* (i.e., at an entry 620 indexed by the handle "2").

Once the credential 610 and corresponding credential handle 605 are established (and stored in cache 600*a*), the network element may send the credential pair (full credential and credential handle) to the disk element (D-module 350). For instance, a CF message 400 may be sent from the network element to the disk element that contains a message type/flag indication 411 (e.g., a "SET_CRED" indication) requesting that the disk element store the credential pair (e.g., in credential field 412) in its credential cache 600*b*. (Alternatively, the network element may utilize a "replicated database (RDB) process," to distribute the credentials and corresponding credential handles to all nodes in the cluster, as will be understood by those skilled in the art.) Because the network element specifies the credential handle, the same credential handle may be used to represent the same credential to multiple disk elements (e.g., "2" represents "CRED 2" on more than one disk element), thus advantageously reducing the size of the credential cache 600*a* of the network element.

The disk element (D-module 350) receives the request for the credential pair, and upon inserting the credential 610 and credential handle 605 into its credential cache 600*b*, the disk element (D-module 350) may send an acknowledgement CF message 400 to the initiating network element (N-module 310). If for any reason the disk element does not successfully establish the credential handle 605 in its cache 600*b*, the disk element may return an error to the network element. For example, if a credential 610 is an improper/invalid credential, a CF message type 411 indicating "ERR_BAD_CRED" may be sent to the network element. Also, the disk element may reject the addition of a new entry 620 to its cache 600*b* if the cache has no space (e.g., not enough memory) to store the new entry (e.g., an "ERR_NO_SPACE" message).

Further, if the network element attempts to set a credential for a credential handle that already exists, the disk element may return an error message, e.g., a CF message 400 with an "ERR_CRED_EXISTS" indication 411. In the event, however, that the network element instructs the disk element to replace the existing credential corresponding to that particular credential handle (e.g., in a CF message 400 with an indication 411 to "REPLACE_EXISTING_CRED"), the previous credential corresponding to that handle may be replaced accordingly without error. Moreover, there may exist multiple credential types for a same requester/client (e.g., for different client protocols, CIFS, NFS, etc.), as will be understood by those skilled in the art. As such, a network element may wish to merge the previous existing credential indexed by a credential handle with a new credential. If so, a CF message 400 (e.g., indicating "ADD_TO_EXISTING_CRED") may be used to instruct the disk element to merge the supplied credential 412 in the message with the existing credential 610 in the cache 600*b*, for example, to add new credential types (e.g., allowable only when the two credentials do not contain any overlapping types).

Prior to utilizing the cached credentials in a request message 400, the network element may await confirmation from the disk element that the credential and credential handle have been successfully stored in cache 600*b*. In response to receiving an error notification from the disk element, however, the network element may resubmit the credential and credential handle in a new SET_CRED request, or may determine that requests corresponding to this rejected credential should be sent with a full credential in a conventional manner (e.g., where the disk element is unable to add the credential to its cache). Alternatively, to alleviate the latency associated with round-trip messaging (confirmation/rejection of credentials), the network element may optimistically send a request to the disk element using the credential handle immediately after requesting that the credential handle be set. In other words, the network element thus assumes that the disk element will have successfully cached the credential and credential handle. If not, the disk element may reject the request having the unsuccessful credential handle.

Once the credentials 610 have been successfully cached in cache 600*a* and 600*b*, and indexed by corresponding credential handles 605, requests may then be sent between the network and disk elements using the credential handles. For instance, assume the network element (N-module 310) receives a request from a client/requester 180. The network element determines the corresponding credential for the requester and performs a lookup operation into its credential cache 600a to find the proper credential 610. Notably, the network element should maintain a sufficient amount of the actual credential 610 in its cache 600a in order to properly match the credentials for the incoming requests. For instance, where a certain subset of a full credential (i.e., a partial credential) is all that is required to uniquely identify a credential, only that subset need be stored in credential field 610. (Disk element credential cache 600b, however, may illustratively require the entire credential to be used, as described herein.)

The network element adds the appropriate corresponding credential handle 605 to CF message 400 sent to the disk element, which then performs another lookup operation into its credential cache 600b to find the original cached credential (i.e., the full credential necessary to process the request). In this manner, the traffic sent between the elements may be substantially reduced by providing efficient transmission of credentials (i.e., sending a smaller handle than the full credential). Notably, if the disk element does not have a credential 610 corresponding to the provided credential handle 412 in the message 400, the disk element may reject the request accordingly (e.g., an "ERR_NO_CRED" indication 411). At this time, the network element may resubmit the credential and credential handle in a new SET_CRED request as described above, or may resubmit the rejected request with a full credential in a conventional manner.

Generally, the credential handles 605 are "scoped" (established) by session, such that the credential caches 600b on the disk elements are not shared among different sessions. In the event the session fails, the cached credentials of the disk elements are illustratively invalidated. In such an event, upon reestablishing the session, the network element may create new credential handles 605 for the corresponding credentials 610 (e.g., "4" for "CRED 2"). Alternatively, the network element may reuse the old handles (e.g., "2" for "CRED 2") if the handles remain stored in cache 600a; however, because the disk element credential cache 600b has been invalidated, the network elements should resubmit the previously-used credential handles to the disk elements for the new session. The disk element should further be adapted to store credentials and credential handles in its cache 600b for a configurable length of time sufficient to be effectively used, as will be understood by those skilled in the art.

Figure 7:
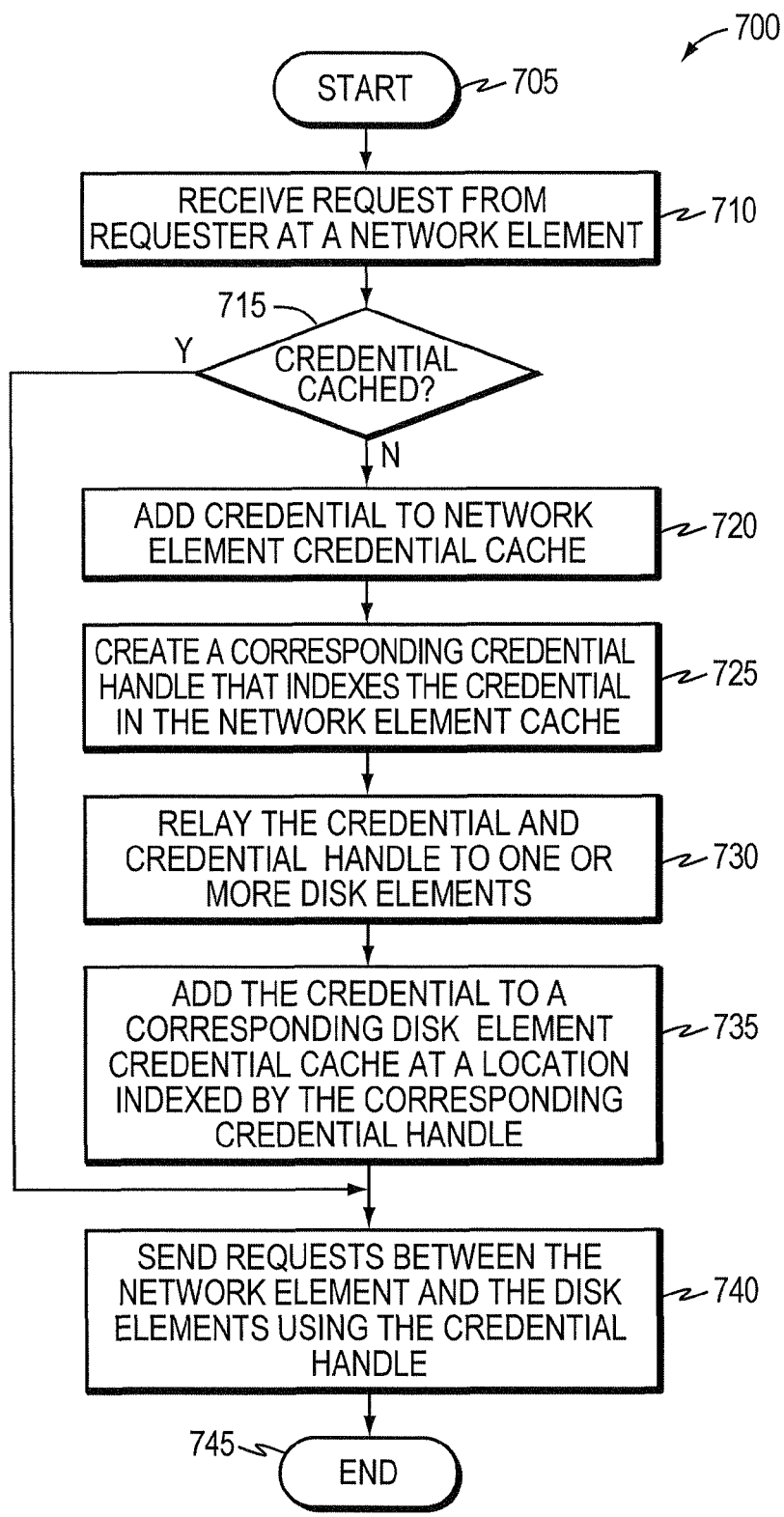
FIG. 7 is a flowchart detailing the steps of a procedure for efficiently transmitting credentials in a clustered storage system in accordance with one or more embodiments of the present invention.

FIG. 7 is a flowchart detailing the steps of a procedure 700 for efficiently transmitting credentials in a clustered storage system in accordance with one or more embodiments of the present invention. The procedure starts in step 705 and proceeds to step 710 where a network element (e.g., N-module 310) receives a request from a requester (e.g., a client/user) as described above. If a credential for the requester has not been cached in step 715 (and credential caching is to be used), the network element adds a corresponding credential to its credential cache 600a (e.g., "CRED 2" in field 610 of an entry 620) in step 720. The network element also creates a corresponding credential handle (e.g., a handle "2" in field 605 of that particular entry 620) in step 725 that indexes the credential in the network element's credential cache. As noted, while the network element is shown establishing a cached credential in response to receiving a request, the network element may establish cached credentials in response to other events, such as a pre-configuration of cache handles, etc.

In step 730, the network element relays the credential and the corresponding credential handle to one or more disk elements (D-modules 350), such as those to which the network element wishes to forward the requests, as mentioned above. In response (e.g., assuming no errors exist as described herein), each disk element adds the credential ("CRED 2") to its corresponding credential cache (e.g., 600b) in step 735 at a location indexed by the corresponding credential handle (e.g., at entry 620 corresponding to handle "2" in field 605).

Once the credential handle has been established for a particular credential at both the network element and disk element (or if in step 715 the credential has already been cached with an established handle), requests may be sent between the network element and the disk element over a session using the credential handle in step 740, as described herein. The procedure 700 ends in step 745.

In addition (or alternatively), in accordance with one or more embodiments described herein, the network element may further send a series of chained requests to one or more disk elements for the same credential/credential handle with an indication that the requests use the same credential without sending the credential or credential handle to the disk element. For instance, a network element may send a large series of requests to one or more disk elements, e.g., for a large amount of stored data (or a large file) for the same client 180. By using a special CF message type/flag 411 for the current credential, credential traffic within the cluster fabric 150 may be further reduced (e.g., removing the need for any credential field 412), as well as potentially reducing the processing of the credential at the disk element.

Typically, in accordance with this embodiment, the first request (CF message 400) of the series of requests contains a credential 412, and the type/flags field 411 may specifically indicate that this credential 412 is to be used for the series of requests (e.g., using a "SET_AS_CURRENT_CRED" indication 411). Notably, the current credential that is to be used for the series of chained requests may be a full credential or a credential handle (indexing a cached credential) as described above. The receiving disk element then stores the credential (or credential handle) within a special entry 622 (FIG. 6) of its credential cache 600b that is used to indicate the current credential 610 accordingly. Subsequently, any remaining requests of the series of chained requests may be sent with an indication that the requests are for the same credential as the first request (i.e., the credential of the series of chained requests) without sending the credential to the disk element (i.e., using a message type/flag 411 indicating that a "CURRENT_CRED" is to be used). That is, when the disk element receives a request for the current credential, entry 622 of the credential cache 600b is utilized for the request. Those skilled in the art will understand that while the CF message type/field 411 is illustratively used to indicate the current credential, the credential field 412 may alternatively be used with a similar indication (e.g., with a credential handle specifically indicating the current credential).

Moreover, in accordance with an alternative embodiment, the disk element may be configured to interpret the requests as a series of chained requests (e.g., using a is type/indication 411, or other means as will be understood by those skilled in the art). Thus, the disk element may simply use whichever credential 412 has been sent in the first message of that chain as the current credential for any remaining requests of the series. Also, while the current credential is generally only defined for the scope of a chain, there may be occasions where the same client 180 accounts for a large proportion of the network element's requests to the disk element. Setting the current credential 622 to correspond to this client 180 may also allow the network element to more efficiently relay the credential for this client 180 as the CURRENT_CRED (e.g., a "favorite" credential) with or without a series of chained requests, further reducing overall traffic in the cluster fabric 150.

Figure 8:
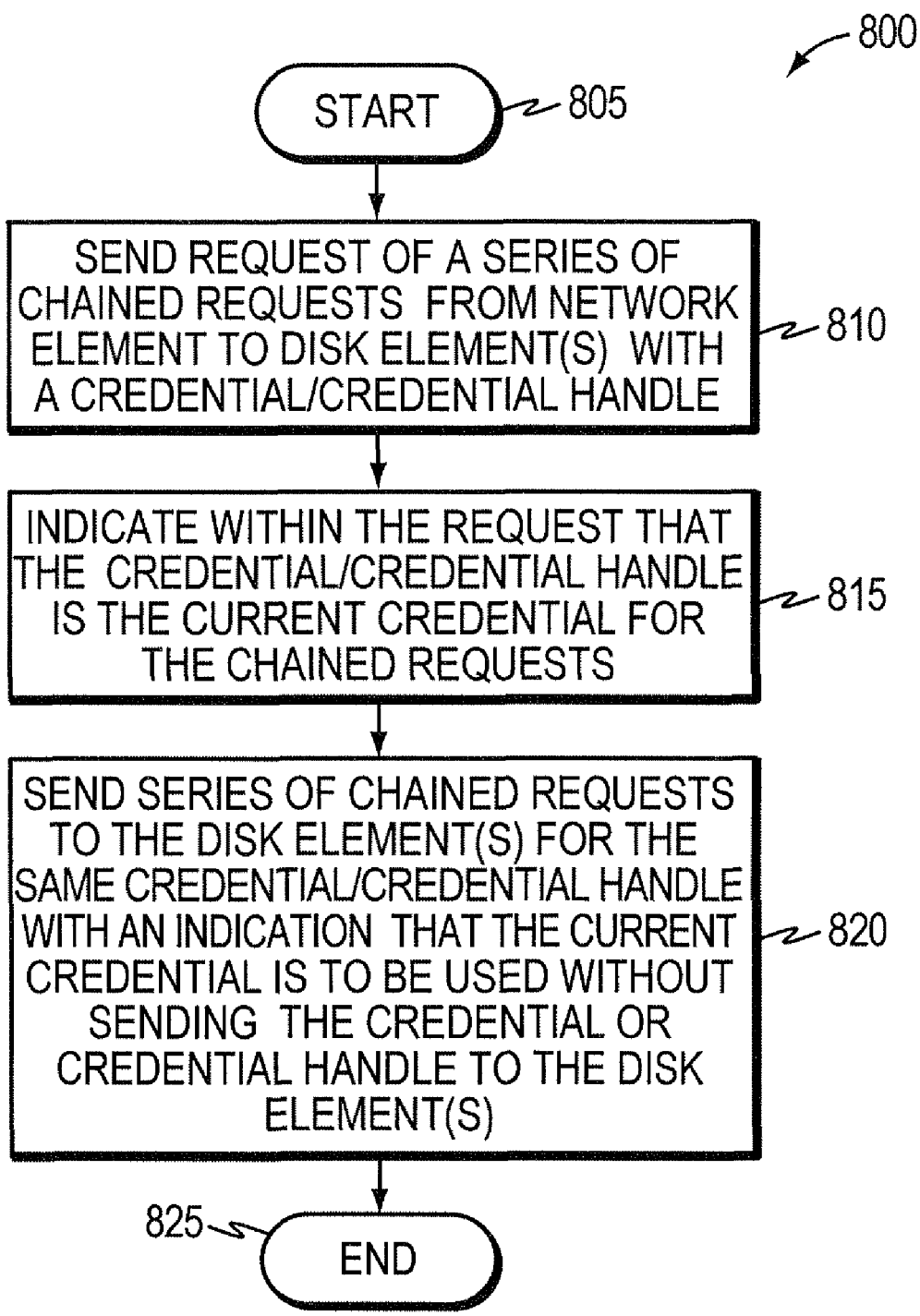
FIG. 8 is a flowchart detailing the steps of a procedure for efficiently identifying requesters for chained requests in a clustered storage system in accordance with one or more embodiments of the present invention.

FIG. 8 is a flowchart detailing the steps of a procedure 800 for efficiently identifying requesters for chained requests in a clustered storage system in accordance with one or more embodiments of the present invention. The procedure starts in step 805 and proceeds to step 810 where a network element sends a request of a series of chained requests (e.g., the first request) to one or more disk elements with a credential or corresponding credential handle, as described above. In step 815, the network element indicates within this request that the credential/credential handle is the current credential for the chained requests (e.g., using the SET_AS_CURRENT_CRED indication). As noted, the disk element may thus populate an entry 622 of its credential cache 600*b* with the "current credential." In step 820, the network element continues to send the series of chained requests to the disk element for the same credential/credential handle with an indication that the current credential is to be used without sending the credential or credential handle to the disk element (e.g., using the CURRENT_CRED indication). The procedure ends in step 825, for example, when the network element no longer sends requests for the series or when the current credential is changed, as mentioned above.

In addition to the techniques described above (e.g., to set, use, and respond to credential handles), other management and maintenance mechanisms of credential caching may be used in accordance with the present invention. For instance, the disk elements (D-modules 350) generally manage their own caches 600*b*. Cached entries 620 may be removed ("evicted") by the disk elements, or an entire cache 600*b* may be invalidated at is any time. The length of time a cache entry 620 remains in the cache may be a decision local to the disk elements. Also, other reasons for allowing the disk elements to control their own caches 600*b* may include, e.g., where the network elements (N-modules 310) and disk elements (D-modules 350) are located on different nodes 200.

Further, the network element manages its own cache 600*a*, but may occasionally desire to check/verify the status of the disk elements' caches 600*b*. For instance, the network element may send a CF message 400 (e.g., a "GET_GRED" message type 411) to a disk element to determine the content (credential 610) of that disk element's credential cache 600*b* that is indexed by a particular credential handle (412 in sent message 400, indexed by 605 in cache 600*b*). Also, the network element may request that the disk element remove and/or invalidate a particular credential handle 605 in cache 600*b* with a CF message 400 having a "DISCARD_CRED" message type 411. In either case, credential field 412 of the CF message 400 may be populated by the desired credential handle accordingly. Those skilled in the art will understand that other messages, requests, updates, etc. in addition to those described herein may be sent between the network element and disk element to manage/maintain credential caching in a storage cluster, and that those shown herein (and their illustrative types) are merely examples.

Figure 9:
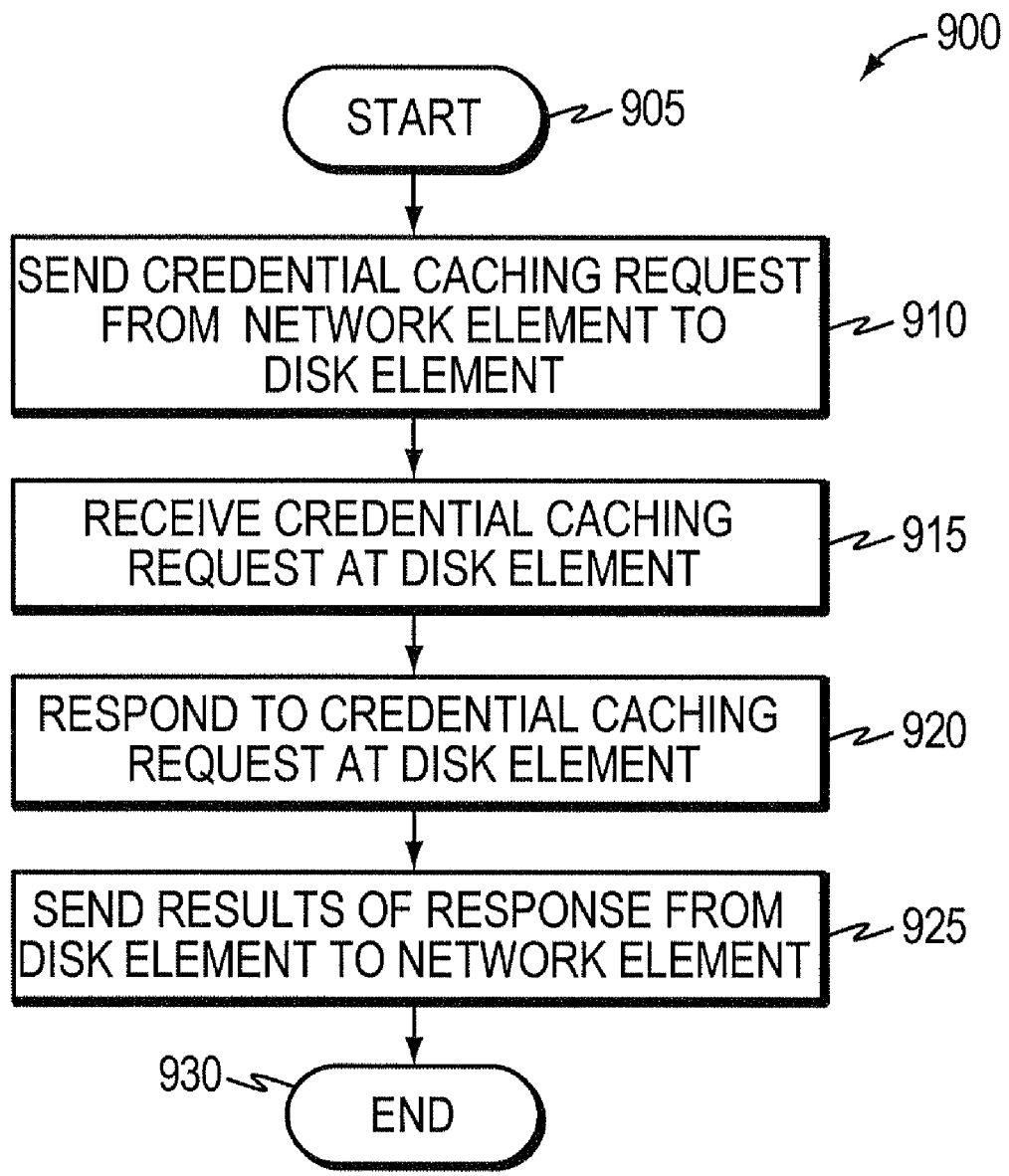
FIG. 9 is a flowchart detailing the steps of a procedure for managing/maintaining credential caching in a storage cluster in accordance with one or more embodiments of the present invention.

FIG. 9 is a flowchart detailing the steps of a procedure 900 for managing/maintaining credential caching in a storage cluster in accordance with one or more embodiments of the present invention. The procedure starts in step 905 and proceeds to step 910 where a network element sends a credential caching request to one or more disk elements, as described herein. For example, various messages (CF messages 400) may be sent requesting the setting of a credential handle, the getting of a credential handle, the changing of a credential handle, etc. In step 915*a* disk element receives the credential caching request and responds to the request in step 920 (e.g., by attempting to set, get, change, etc., the handle). The disk element sends any results of the response of step 920 to the network element in step 925. For instance, notification of success or failure, particular errors, etc. as described herein may be sent to the network element accordingly. The procedure ends in step 930.

Notably, in addition to utilizing credential handles and/or "current" credentials, the network elements (N-modules 310) may still pass full credentials (in credential field 412 of CF message 400) to the disk elements (D-modules 350) with each request in a conventional manner, i.e., "inline" credentials. For example, a message type/flag 411 indicating an "INLINE_CRED" may be used to indicate that the receiving disk element use the inline credential 412 for that particular request (e.g., only), and that the disk element need not store the credential 412 of the message in cache 600*b*. Also, no credential handle 605 need be created (cached) at the network element (although may be for other reasons). Particularly, maintaining the ability to utilize inline credentials is advantageous in the event many users/clients 180 each issue a small number of requests to the cluster storage system 100. That is, where a client (having a credential) only issues a small number of requests, it may be more efficient to add a per-message overhead (i.e., full credentials) than to endure the round-trip messaging to establish a credential handle as described above. On the other hand, as described herein, credential handles may be better suited for a smaller number of users that send a large number of requests. Accordingly, network elements may selectively determine which credentials to cache (to apply handles) based on one or more factors, such as cache size, number of requests, etc.

E. Other Embodiments

While there have been shown and described illustrative embodiments that efficiently transmit credentials between network elements and disk elements in a clustered storage system, it is to be understood that various other adaptations and modifications may be made within the spirit and scope of the present invention. For example, the embodiments have been shown and described herein with/using clustered storage systems, particularly network elements and disk elements and the associated cluster interface. However, the embodiments of the invention in its broader sense are not so limited, and may, in fact, be used with any devices/nodes that exchange credentials in a similarly applicable manner, as will be understood by those skilled in the art. Also, while the above description illustratively describes utilizing various protocols and specific messages, those skilled in the art will understand that other mechanisms (e.g., protocols and mesasages) may be used to transmit credentials in accordance with the present invention.

In addition, while the above embodiments describe creating the credential handles at the network elements (N-modules) and relaying the credential handles to the disk elements (D-modules), an embodiment of the present invention may also create credential handles at the disk elements. For instance, the network element may receive a request, may cache credentials for the request, and may forward the request to the appropriate disk element(s). In accordance with this additional embodiment, the disk element may then create an associated credential handle for the cached credential of the request, and may return the credential handle to the network element from which the request was received. (For example, the network element may send a credential caching request to the disk module to perform such services, as in FIG. 9 above.) In this manner, the network element may use the credential handle as created/defined by the disk element in a manner similar to handles created by the network element as described above.

Advantageously, the novel technique efficiently transmits credentials between network elements and disk elements in a clustered storage system. By establishing credential caches on the network elements and disk elements, traffic sent within the clustered storage system between the network elements and disk elements (particularly, credential information) may be substantially reduced. Also, processing of the credential information may be reduced in the network elements and disk elements, e.g., particularly where large credentials are used.

The foregoing description has been directed to particular embodiments of this invention. It will be apparent, however, that other variations and modifications may be made to the described embodiments, with the attainment of some or all of their advantages. Specifically, it should be noted that the principles of the present invention may be implemented in non-distributed file systems. Furthermore, while this description has been written in terms of N and D-modules, the teachings of the present invention are equally suitable to systems where the functionality of the N and D-modules are implemented in a single system. Alternately, the functions of the N and D-modules may be distributed among any number of separate systems, wherein each system performs one or more of the functions. Additionally, the procedures, processes and/or modules described herein may be implemented in hardware, software, embodied as a computer-readable medium having program instructions, firmware, or a combination thereof. Therefore, it is the object of the appended claims to cover all such variations and modifications as come within the true spirit and scope of the invention.

What is claimed is:

1. A method for efficiently transmitting credentials among nodes of a clustered storage system, comprising:
    adding a credential of a requester to a N-module cache of a N-module, the N-module operatively connected to the requester over a network;
    creating a corresponding credential handle that indexes the credential in the N-module cache;
    relaying the credential and the credential handle between the N-module and a D-module, the D-module operatively connected to a storage device served by the D-module;
    adding the credential to a corresponding D-module cache of the D-module at a location indexed by the corresponding credential handle; and
    sending an access request of the requester between the N-module and the D-module to access data at the storage device using the credential handle to authenticate the requester.

2. The method as in claim 1, wherein the clustered storage system comprises one or more file servers.

3. The method as in claim 1, wherein adding the credential to the N-module cache comprises:
    authenticating the requester at the N-module; and
    in response, generating the credential for the requester.

4. The method as in claim 3, wherein the requester is selected from a group consisting of: a client, a user, a machine, an element, a node, and a storage system.

5. The method as in claim 1, further comprising:
    evicting the credential from one of the N-module cache and the D-module cache.

6. The method as in claim 1, further comprising:
    replacing the credential handle with a new credential handle.

7. The method as in claim 1, further comprising:
    rejecting the creation of the credential handle.

8. The method as in claim 1, further comprising:
    rejecting the access request if the credential handle is invalid.

9. The method as in claim 1, further comprising:
    rejecting the credential handle; and
    resubmitting the credential handle between the N-module and the D-module.

10. The method as in claim 1, further comprising:
    rejecting the credential handle; and
    sending an error message between the D-module and the N-module.

11. The method as in claim 1, further comprising:
    storing a sufficient amount of the credential in the N-module cache to match the credential with the corresponding credential handle.

12. The method as in claim 1, further comprising:
    changing the credential at the D-module corresponding to the credential handle.

13. The method as in claim 1, wherein the credential handle is smaller than the credential.

14. The method as in claim 1, further comprising:
    sending the access request as a first access request of a series of chained access requests using the credential between the N-module and the D-module;
    specifying that the corresponding credential handle is for the series of chained access requests in the first access request; and
    sending remaining access requests of the series with an indication that the remaining access requests are for the credential used by the first access request without sending the credential or the corresponding credential handle between the N-module and the D-module to authenticate the requester.

15. The method as in claim 1, wherein the D-module comprises a disk element.

16. The method as in claim 1, further comprising:
    distributing the credential and the credential handle to one or more nodes of the clustered storage system using a replicated database.

17. The method as in claim 1, further comprising:
    merging the credential with a new credential.

18. The method as in claim 1, further comprising:
    using a cluster fabric (CF) message type as the credential.

19. A method for efficiently transmitting credentials among nodes of a clustered storage system, comprising:
    sending a first request of a series of chained requests comprising a credential between a N-module and a D-module, the N-module enabled to operatively connect to a client, and the D-module operatively connected to a storage device served by the D-module;
    specifying a corresponding credential handle indexing the credential in a cache of the clustered storage system associated with the series of chained requests in the first request; and
    sending remaining requests of the series of chained requests with an indication that the remaining requests are for the credential without sending the corresponding credential handle between the N-module and the D-module.

20. The method as in claim 19, wherein the first request is sent from the N-module to the D-module.

21. The method as in claim 19, wherein the first request further comprises a cluster fabric (CF) message type.

22. The method as in claim 19, wherein the N-module and the D-module each have their own cache to store the credential.

23. A clustered storage system for transmitting credentials among nodes of the clustered storage system, comprising:
- a N-module configured to operatively connect to a requester over a network;
- a cache of the N-module configured to store a credential of the requester;
- the cache further configured to store a credential handle that corresponds to the credential configured to index the credential in the cache;
- one or more D-modules operatively connected to a storage device served by the D-module; and
- the N-module and the one or more D-modules configured to send one or more requests of the requester between the N-module and the one or more D-modules using the credential handle to authenticate the requester.

24. The clustered storage system as in claim 23, further comprising:
- a cluster interface configured to relay the credentials and the credential handles between the one or more D-modules, and further configured to transmit the one or more requests between the N-module and the one or more D-modules by sending the credential handle without the credential to authenticate the requester.

25. The clustered storage system as in claim 23, wherein the D-module comprises a disk element.

26. The clustered storage system as in claim 23, wherein the cache of the N-module is between the N-module and the D-module.

27. The clustered storage system as in claim 23, further comprising:
- a replicated database configured to distribute the credential and the credential handle to one or more nodes of the clustered storage system.

28. The clustered storage system as in claim 23, wherein the N-module is configured to merge the credential with a new credential.

29. The clustered storage system as in claim 23, wherein the credential comprises a cluster fabric (CF) message type.

30. A non-transitory computer readable storage medium containing executable program instructions for execution by a processor, comprising:
- program instructions that add a credential of a requester to a N-module cache of a N-module, the N-module operatively connected to the requester over a network;
- program instructions that create a corresponding credential handle that indexes the credential in the N-module cache;
- program instructions that relay the credential and the credential handle between the N-module and a D-module, the D-module operatively connected to a storage device served by the D-module; and
- program instructions that send an access request of the requester between the N-module and the D-module to access data at the storage device using the credential handle to authenticate the requester.

* * * * *

UNITED STATES PATENT AND TRADEMARK OFFICE
CERTIFICATE OF CORRECTION

PATENT NO. : 8,099,766 B1
APPLICATION NO. : 11/691179
DATED : January 17, 2012
INVENTOR(S) : Peter F. Corbett It is certified that error appears in the above-identified patent and that said Letters Patent is hereby corrected as shown below:

In Col. 3, line 11 should read:
mands and ~~is~~ data, over the session, typically through the use In Col. 3, line 51 should read:
ventional NFS-Kerberos implementation, the client ~~is~~ trans- In Col. 6, line 8 should read:
full) credentials at ~~is~~ caches of particular nodes of the storage In Col. 9, line 59 should read:
are organized into the ~~is~~ inode file. A file system (fs) info In Col. 15, line 5 should read:
transfer complete (full) credentials over ~~is~~ the cluster fabric In Col. 19, line 44 should read:
ment may send a CF message 400 (e.g., a "GET_~~GRED~~ CRED"

In Col. 20, lines 53-54 should read:
understand that other mechanisms (e.g., protocols and ~~mesas~~ messages) may be used to transmit credentials in accordance with In Col 23, line 24 should read:
a cluster interface configured to relay the ~~credentials~~ credential and In Col. 24, line 2 should read:
the cache of the N-module is shared between the N-module and the Signed and Sealed this
Sixth Day of November, 2012

David J. Kappos
*Director of the United States Patent and Trademark Office*